(12) United States Patent
Sakurai et al.

(10) Patent No.: US 10,928,716 B2
(45) Date of Patent: Feb. 23, 2021

(54) PROJECTION DISPLAY DEVICE

(71) Applicant: HAMAMATSU PHOTONICS K.K., Hamamatsu (JP)

(72) Inventors: Naoto Sakurai, Hamamatsu (JP); Akihiro Oguri, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 0 days.

(21) Appl. No.: 15/561,991

(22) PCT Filed: Mar. 2, 2016

(86) PCT No.: PCT/JP2016/056445
§ 371 (c)(1),
(2) Date: Sep. 27, 2017

(87) PCT Pub. No.: WO2016/158176
PCT Pub. Date: Oct. 6, 2016

(65) Prior Publication Data
US 2018/0067388 A1    Mar. 8, 2018

(30) Foreign Application Priority Data

Mar. 31, 2015  (JP) .............................. JP2015-072474

(51) Int. Cl.
*G03B 21/20* (2006.01)
*H04N 5/74* (2006.01)
(Continued)

(52) U.S. Cl.
CPC .......... *G03B 21/2033* (2013.01); *B60K 35/00* (2013.01); *G02B 5/0278* (2013.01);
(Continued)

(58) Field of Classification Search
CPC ........ G02B 27/01–0198; G02B 5/0278; G02B 27/00–0189; H04N 9/3129;
(Continued)

(56) References Cited

U.S. PATENT DOCUMENTS

2006/0289760 A1* 12/2006 Bathiche ................ G02B 5/282
                                                      250/332
2007/0008501 A1*  1/2007 Yamazaki ............ G03B 21/142
                                                      353/97
(Continued)

FOREIGN PATENT DOCUMENTS

CN          1892406 A      1/2007
JP       2007-17649 A      1/2007
(Continued)

OTHER PUBLICATIONS

International Preliminary Report on Patentability dated Oct. 12, 2017 for PCT/JP2016/056445.

*Primary Examiner* — Christina A Riddle
*Assistant Examiner* — Christopher A Lamb, II
(74) *Attorney, Agent, or Firm* — Faegre Drinker Biddle & Reath LLP

(57) ABSTRACT

A projection display device includes: a light source that emits a first laser light for displaying a projection and a second laser light for inspection; a scanning drive mirror that reflects the first laser light and the second laser light emitted from the light source, and uses the first laser light and the second laser light in scanning; a light diffusion unit that allows the first laser light used in the scanning by the scanning drive mirror to be transmitted through the light diffusion unit and diffuses the first laser light; a light selection unit that allows the first laser light to be transmitted through the light selection unit and reflects the second laser light at a position on an emission surface of the light (Continued)

diffusion unit; and a light detection unit that detects the second laser light reflected by the light selection unit.

13 Claims, 13 Drawing Sheets

(51) Int. Cl.
| | |
|---|---|
| *G02B 5/26* | (2006.01) |
| *G02B 5/20* | (2006.01) |
| *G02B 26/10* | (2006.01) |
| *G02B 5/02* | (2006.01) |
| *G02B 27/09* | (2006.01) |
| *G03B 21/28* | (2006.01) |
| *B60K 35/00* | (2006.01) |
| *G02B 27/01* | (2006.01) |

(52) U.S. Cl.
CPC ............... *G02B 5/208* (2013.01); *G02B 5/26* (2013.01); *G02B 26/10* (2013.01); *G02B 26/101* (2013.01); *G02B 27/0101* (2013.01); *G02B 27/0977* (2013.01); *G03B 21/28* (2013.01); *H04N 5/74* (2013.01); *B60K 2370/1529* (2019.05); *B60K 2370/23* (2019.05); *B60K 2370/27* (2019.05); *B60K 2370/333* (2019.05); *B60K 2370/334* (2019.05); *B60K 2370/52* (2019.05)

(58) Field of Classification Search
CPC .. H04N 9/3161; H04N 9/3164; H04N 9/3194; H04N 9/31–3197; G03B 21/2013; G03B 21/2033; G03B 21/2066; G03B 21/00–64
See application file for complete search history.

(56) References Cited

U.S. PATENT DOCUMENTS

| | | | |
|---|---|---|---|
| 2009/0141252 A1* | 6/2009 | Kamijima | G03B 21/2053 353/85 |
| 2010/0053591 A1* | 3/2010 | Gibson | H04N 9/3129 356/3.09 |
| 2015/0055204 A1* | 2/2015 | Ichii | G02B 26/0833 359/214.1 |
| 2015/0077823 A1* | 3/2015 | Hashiguchi | G02B 26/0858 359/200.8 |
| 2016/0080709 A1* | 3/2016 | Viswanathan | H04N 9/3155 353/85 |

FOREIGN PATENT DOCUMENTS

| | | |
|---|---|---|
| JP | 2013-130832 A | 7/2013 |
| JP | 2013-200474 A | 10/2013 |
| JP | 2014-86426 A | 5/2014 |
| JP | 2014-171130 A | 9/2014 |
| JP | 2015-22251 A | 2/2015 |
| WO | WO-2014/097683 A1 | 6/2014 |
| WO | WO-2015/004724 A1 | 1/2015 |

* cited by examiner

PROJECTION DISPLAY DEVICE

TECHNICAL FIELD

The present invention relates to a projection display device.

BACKGROUND ART

As a projection display device in the related art, there is known a projection display device including a light source that emits a laser light for displaying a projection, a drive reflection unit that reflects the laser light emitted from the light source and performs scanning with the laser light, a light diffusion unit that diffuses the laser light used in the scanning by the drive reflection unit, and a detection unit that detects detachment of the light diffusion unit (for example, refer to Patent Literature 1).

CITATION LIST

Patent Literature

Patent Literature 1: Japanese Unexamined Patent Publication No. 2013-200474

SUMMARY OF INVENTION

Technical Problem

In the above-described projection display device, it is possible to detect the detachment of the light diffusion unit, but it is difficult to grasp a defect such as a damage that occurs in the light diffusion unit.

An object of the invention is to provide a projection display device capable of grasping a defect such as a damage that occurs in a light diffusion unit.

Solution to Problem

According to an aspect of the invention, there is provided a projection display device including: a light source that emits a first laser light for displaying a projection and a second laser light for inspection; a drive reflection unit that reflects the first laser light and the second laser light emitted from the light source, and uses the first laser light and the second laser light in scanning; a light diffusion unit that allows the first laser light used in the scanning by the drive reflection unit to be transmitted through the light diffusion unit and diffuses the first laser light; a light selection unit that allows the first laser light to be transmitted through the light selection unit and reflects the second laser light at a position on an incident surface of the light diffusion unit, at a position on an emission surface of the light diffusion unit, or at a position that is distant from the emission surface toward an emission side of the light diffusion unit; and a light detection unit that detects the second laser light reflected by the light selection unit.

In the projection display device, the light selection unit reflects the second laser light for inspection at the position on the incident surface of the light diffusion unit, at the position on the emission surface, or at the position that is distant from the emission surface toward the emission side of the light diffusion unit. According to this, a state of the light diffusion unit is reflected on the second laser light reflected by the light selection unit. As a result, according to the projection display device, it is possible to grasp a defect such as a damage that occurs in the light diffusion unit by detecting the second laser light reflected by the light selection unit. In addition, by using the drive reflection unit, it is possible to perform scanning with the second laser light for inspection along a scanning line of the first laser light for displaying a projection. According to this, it is possible to efficiently and reliably grasp a detect that occurs on the scanning line (that is, a defect that has an effect on displaying the projection) while permitting a defect that occurs at a position that deviates from the scanning line (that is, a defect that has no effect on displaying the projection) among defects such as a damage that occurs in the light diffusion unit.

In the projection display device according to the aspect of the invention, the light selection unit may allow the first laser light to be transmitted through the light selection unit and may reflect the second laser light at the position on the emission surface of the light diffusion unit or at the position that is distant from the emission surface toward the emission side of the light diffusion unit. According to this, the second laser light is transmitted through the incident surface and the inside of the light diffusion unit, reaches the emission surface of the light diffusion unit, and is reflected by the light selection unit. As a result, it is possible to grasp a defect that occurs on the incident surface, the emission surface, and the inside of the light diffusion unit.

In the projection display device according to the aspect of the invention, the light source may include a first emission unit that emits the first laser light, and a second emission unit that emits the second laser light. According to this, it is possible to easily make a wavelength region of the first laser light and a wavelength region of the second laser light different from each other.

In the projection display device according to the aspect of the invention, the wavelength region of the first laser light and the wavelength region of the second laser light may deviate from each other. According to this, an optical member that has a function of allowing a light having the wavelength region of the first laser light to be transmitted therethrough and of reflecting a light having the wavelength region of the second laser light can be used as the light selection unit.

In the projection display device according to the aspect of the invention, the wavelength region of the first laser light may be a visible region, and the wavelength region of the second laser light may be an infrared region. A light of an infrared region is less likely to be diffused in comparison to a light of a visible region, and thus it is possible to stabilize detection of the second laser light by the light detection unit.

In the projection display device according to the aspect of the invention, the light source may include an emission unit that emits laser light including the first laser light and the second laser light. According to this, it is possible to realize the light source with a simple configuration.

In the projection display device according to the aspect of the invention, the wavelength region of the first laser light and the wavelength region of the second laser light overlap each other. According to this, an optical member that has a function of allowing a part of laser light to be transmitted therethrough as the first laser light and of reflecting the remainder of the laser light as the second laser light can be used as the light selection unit.

In the projection display device according to the aspect of the invention, the wavelength region of the first laser light and the wavelength region of the second laser light may be visible regions. According to this, a laser light of the visible region that is used in a process to display the projection can be used in a process to detect the second laser light.

The projection display device according to the aspect of the invention may further include a body that accommodates the light source and the drive reflection unit. The light detection unit may be disposed on an outer side of the body. According to this, it is possible to increase the degree of freedom of a position at which the light detection unit is disposed. In addition, it is possible to dispose the light detection unit at a position that is close to the light diffusion unit so as to sufficiently secure an optical quantity of the second laser light for inspection.

The projection display device according to the aspect of the invention may further include a body that accommodates the light source and the drive reflection unit. The light detection unit may be disposed on an inner side of the body. According to this, it is possible to protect the light detection unit.

The projection display device according to the aspect of the invention may further include a control unit that executes a process to detect the second laser light during displaying the projection. According to this, in a case where a defect occurs in the light diffusion unit during displaying the projection, it is possible to immediately grasp the defect.

The projection display device according to the aspect of the invention may further include a control unit that executes a process to detect the second laser light at least one of before displaying the projection and after displaying the projection. According to this, it is possible to prevent displaying the projection from being executed by the light diffusion unit in which a defect occurs.

In the projection display device according to the aspect of the invention, the control unit may determine a state of the light diffusion unit on the basis of a detection value of the light detection unit. According to this, it is possible to appropriately grasp a defect that occurs in the light diffusion unit.

Advantageous Effects of Invention

According to the invention, it is possible to provide a projection display device capable of grasping a defect such as a damage that occurs in a light diffusion unit.

DESCRIPTION OF EMBODIMENTS

Figure 1:
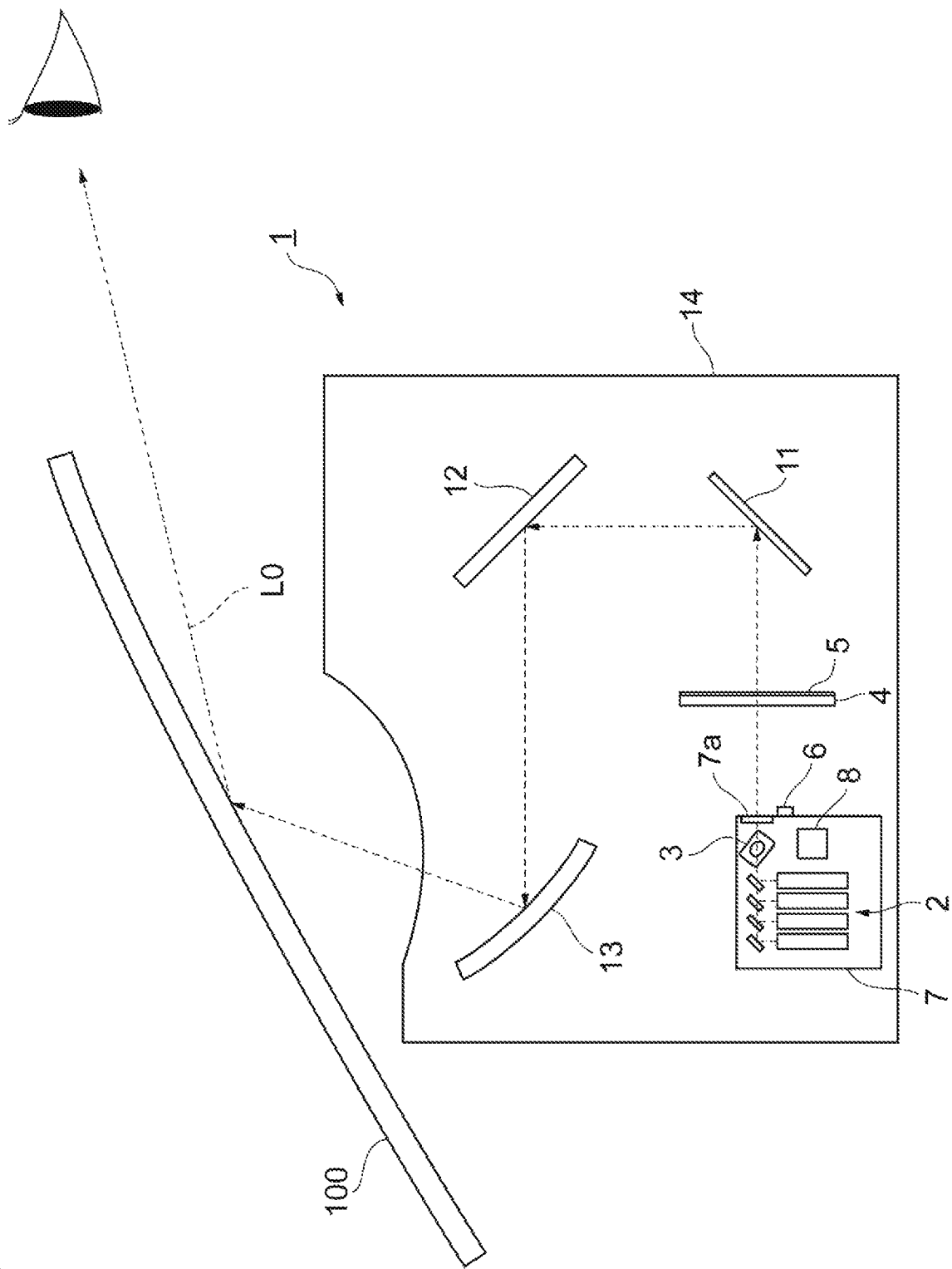
FIG. 1 is a schematic view of a projection display device according to a first embodiment.

Hereinafter, embodiments of the invention will be described in detail with reference to the accompanying drawings. Furthermore, the same reference numeral will be given to the same or corresponding portion in respective drawings, and redundant description will be omitted.

First Embodiment

As illustrated in FIG. 1, a projection display device 1 includes a light source 2, a scanning drive mirror (drive reflection unit) 3, a light diffusion unit 4, a light selection unit 5, and a light detection unit 6. For example, the projection display device 1 is a laser scanning type projection display that is mounted on a vehicle, and displays an image by projection on a front glass 100 of the vehicle. The light source 2 emits a first laser light L1 for displaying a projection and a second laser light L2 for inspection. The scanning drive mirror 3 reflects the first laser light L1 and the second laser light L2 emitted from the light source 2, and scans a predetermined region of the light diffusion unit 4 with the first laser light L1 and the second laser light L2. The light diffusion unit 4 allows the first laser light L1 used in the scanning by the scanning drive mirror 3 to be transmitted therethrough, and diffuses the first laser light L1. At a position on an emission surface of the light diffusion unit 4, the light selection unit 5 allows the first laser light L1 to be transmitted therethrough, and reflects the second laser light L2. The light detection unit 6 detects the second laser light L2 that is reflected by the light selection unit 5.

The projection display device 1 further includes planar mirrors 11 and 12, a concave mirror 13, and a body 14. The planar mirrors 11 and 12, and the concave mirror 13 guide a light L0 (that is, a light that constitutes a video in the first laser light L1 diffused in the light diffusion unit 4) for displaying a projection to the front glass 100 of the vehicle. The body 14 accommodates respective units that constitute the projection display device 1.

Figure 2:
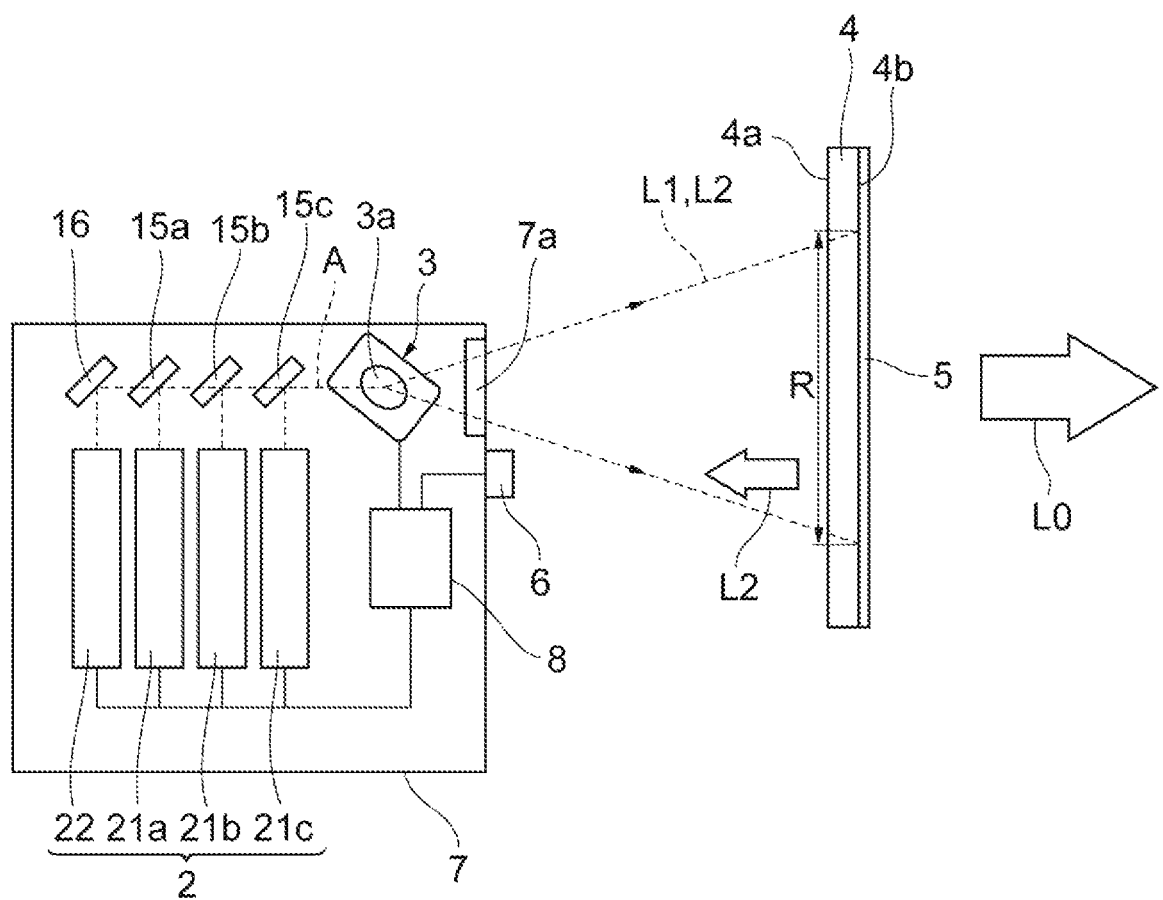
FIG. 2 is a schematic view of a part of the projection display device according to the first embodiment.

As illustrated in FIG. 2, the light source 2 includes a plurality of first emission units 21a, 21b, and 21c, and a second emission unit 22. For example, the first emission units 21a, 21b, and 21c are a red laser diode, a green laser diode; and a blue laser diode, and emit the first laser light L1 for displaying a projection. A wavelength region of the first laser light L1 emitted from each of the first emission units 21a, 21b, and 21c is a visible region. For example, the second emission unit 22 is an infrared laser diode, and emits the second laser light L2 for inspection for grasping a state of the light diffusion unit 4. A wavelength region of the second laser light L2 emitted from the second emission unit 22 is an infrared region. In this manner, the wavelength region of the first laser light L1 and the wavelength region of the second laser light L2 deviate from each other.

The first laser light L1 emitted from the first emission unit 21c is reflected by a mirror 15c, proceeds along an optical path A, and reaches the scanning drive mirror 3. The first laser light L1 emitted from the first emission unit 21b is reflected by a mirror 15b, proceeds along the optical path A, is transmitted through the mirror 15c, and reaches the scanning drive mirror 3. The first laser light L1 emitted from the first emission unit 21a is reflected by a mirror 15a, proceeds along the optical path A, is transmitted through the mirrors 15b and 15c, and reaches the scanning drive mirror 3. The second laser light L2 emitted from the second emission unit 22 is reflected by a mirror 16, proceeds along the optical path A, is transmitted through the mirrors 15a, 15b, and 15c, and reaches the scanning drive mirror 3. For example, the mirrors 15a, 15b, and 15c are dichroic mirrors.

The scanning drive mirror 3 is disposed on the optical path A. For example, the scanning drive mirror 3 is an electromagnetic drive type optical mirror that is manufactured according to a MEMS (Micro Electromechanical Systems) technology. The scanning drive mirror 3 reflects the first laser light L1 and the second laser light L2 that proceed along the optical path A, by swing the mirror 3a, and scans the predetermined region R of the light diffusion unit 4 with the first laser light L1 and the second laser light L2.

Figure 3:
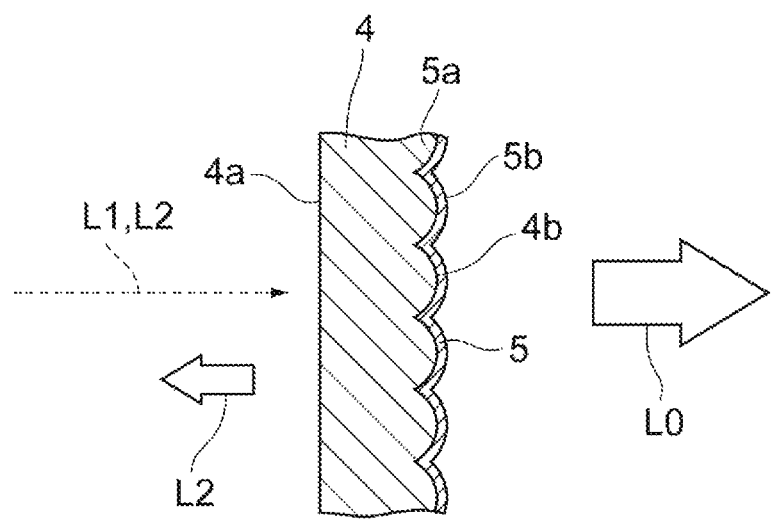
FIG. 3 is a cross-sectional view of a light diffusion unit and a light selection unit of the projection display device according to the first embodiment.

As illustrated in FIG. 3, the light diffusion unit 4 is disposed on an extended line of the optical path A. For example, the light diffusion unit 4 is a microlens array including a plurality of microlenses arranged in a matrix shape, and allows the first laser light L1 for displaying a projection used in the scanning by the scanning drive mirror 3 to be transmitted therethrough, and diffuses the first laser light L1. An incident surface 4a of the light diffusion unit 4 is configured as a flat surface. An emission surface 4b of the light diffusion unit 4 is constituted by a plurality of convex surfaces corresponding to the plurality of microlenses.

The light selection unit 5 is formed on the emission surface 4b of the light diffusion unit 4 in such a manner that a surface 5a on a light diffusion unit 4 side and a surface 5b opposite to the surface 5a conform to the plurality of convex surfaces in the emission surface 4b of the light diffusion unit 4. For example, the light selection unit 5 is a light selection film that is coated on the emission surface 4b of the light diffusion unit 4, and has a function of allowing a light having a wavelength region of the first laser light L1 for displaying a projection to be transmitted therethrough and of reflecting a light having a wavelength region of the second laser light L2 for inspection. The light selection unit 5 is provided at least in the predetermined region R that is scanned with the first laser light L1, in the emission surface 4b of the light diffusion unit 4.

As illustrated in FIG. 2, for example, the light detection unit 6 is an infrared detector and is disposed at a position capable of detecting the second laser light L2 for inspection that is reflected by the light selection unit 5.

The projection display device 1 further includes a body 7. The body 7 accommodates the light source 2, the mirrors 15a, 15b, 15c, and 16, and the scanning drive mirror 3. The body 7 is provided with a window 7a through which the first laser light L1 and the second laser light L2 used in the scanning by the scanning drive mirror 3 are emitted to the outside. Furthermore, the light detection unit 6 is formed on an outer surface of the body 7 to face the light diffusion unit 4. That is, the light detection unit 6 is disposed between the scanning drive mirror 3 and the light diffusion unit 4 in a direction in which the scanning drive mirror 3 and the light diffusion unit 4 face each other. In this manner, the light detection unit 6 is disposed on an outer side of the body 7.

The projection display device 1 further includes a control unit 8. The control unit 8 is constituted by a CPU (Central Processing Unit), a ROM (Read Only Memory), a RAM (Random Access Memory), and the like, and control respective units of the projection display device 1. The control unit 8 executes a process to display the projection and a process to detect the second laser light L2. Furthermore, the control unit 8 may be accommodated in the body 7, or may be disposed on an outer side of the body 7.

Figure 4:
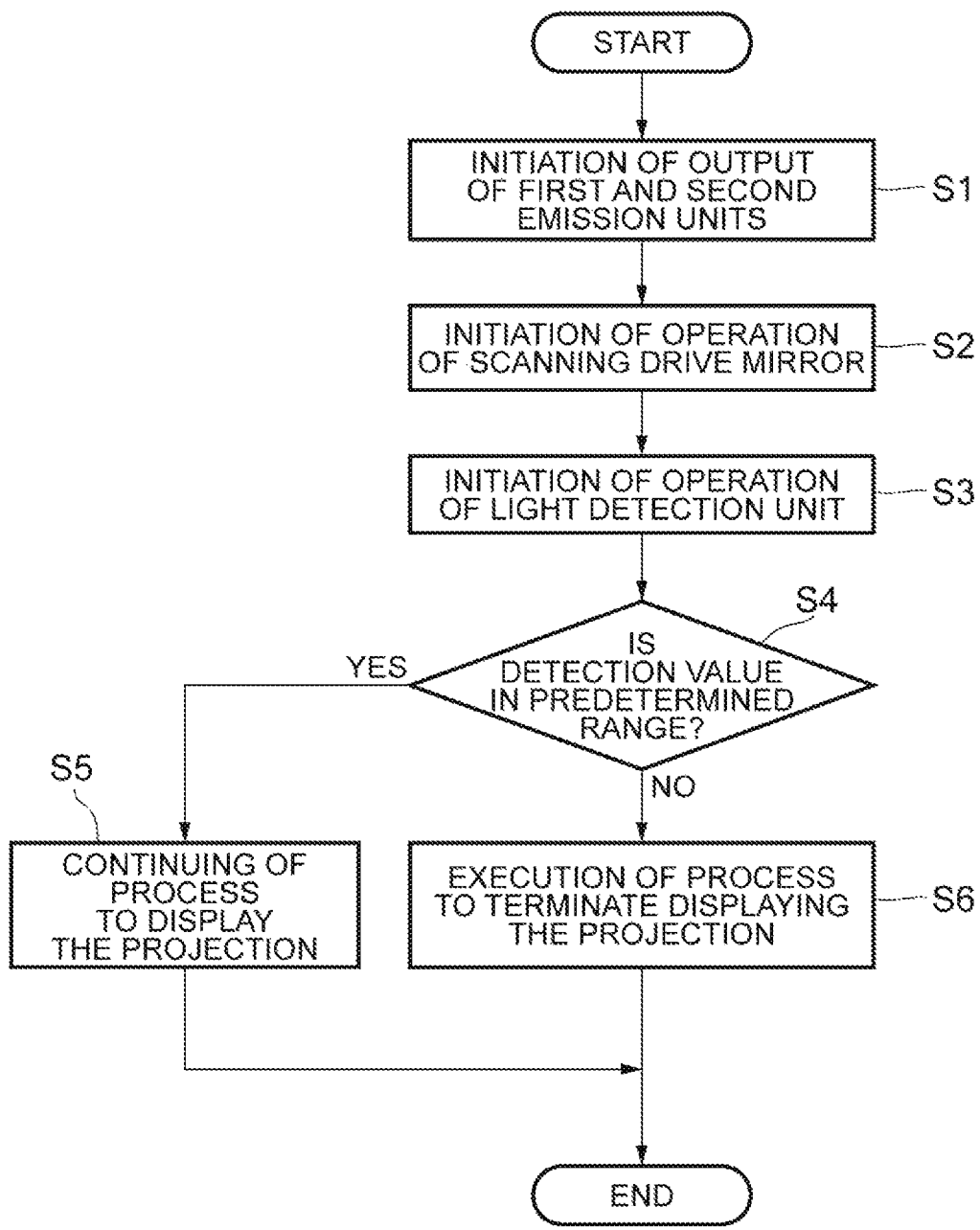
FIG. 4 is a flowchart illustrating an example of a process executed by a control unit of the projection display device according to the first embodiment.

Description will be given of an example of a process executed by the control unit 8 (an example in which the process to detect the second laser light L2 is executed during displaying the projection) with reference to FIG. 4.

First, when receiving an input signal to initiate displaying the projection, the control unit 8 switches output of each of the plurality of first emission units 21a, 21b, and 21c, and the second emission unit 22 from off to on (step S1). According to this, the first laser light L1 and the second laser light L2 are emitted from the plurality of first emission units 21a, 21b, and 21c, and the second emission unit 22.

The control unit 8 initiates an operation of the scanning drive mirror 3 approximately simultaneously with step S1 (step S2), and the control unit 8 initiates an operation of the light detection unit 6 approximately simultaneously with steps S1 and S2 (step S3). According to this, in the scanning drive mirror 3, swinging of the mirror 3a is initiated, and the predetermined region R of the light diffusion unit 4 is scanned with the first laser light L1 and the second laser light L2 emitted from the light source 2.

At this time, a ratio of the first laser light L1 for displaying a projection that is emitted from the first emission units 21a, 21b, and 21c can vary in correspondence with a scanning position with the first laser light L1 in the predetermined region R of the light diffusion unit 4. According to this, a light L0 (that is, a light that constitutes a video in the first laser light L1 diffused in the light diffusion unit 4) for displaying a projection is guided to the front glass 100 of the vehicle by the planar mirrors 11 and 12 and the concave mirror 13, and reaches eyes of a driver as a video after reflection from the front glass 100 of the vehicle.

On the other hand, the second laser light L2 for inspection used in the scanning by the scanning drive mirror 3 is diffused by the light diffusion unit 4, and is reflected by the light selection unit 5. The second laser light L2 reflected by the light selection unit 5 is transmitted again through the light diffusion unit 4 and is detected by the light detection unit 6.

Here, the control unit 8 receives a detection value related to an optical quantity of the second laser light L2 from the light detection unit 6. The detection value is correlated to a scanning position of the second laser light L2 in the predetermined region R of the light diffusion unit 4. In addition, the control unit 8 determines a state of the light diffusion unit 4 on the basis of the detection value (step S4). More specifically, the control unit 8 stores a reference value related to the optical quantity of the second laser light L2 in correlation with the scanning position of the second laser light L2 in the predetermined region R of the light diffusion unit 4. In correspondence with the scanning position of the second laser light L2 in the predetermined region R of the light diffusion unit 4, the control unit 8 compares the detection value and the reference value that correspond to the position. In a case where the detection value is in a predetermined range from the reference value, the control unit 8 determines that the state of the light diffusion unit 4 is normal, and continues the process to display the projection (step S5).

On the other hand, in a case where the detection value is out of the predetermined range from the reference value, the control unit 8 determines that a defect occurs in the light diffusion unit 4 as the state of the light diffusion unit 4, and executes a process to terminate displaying the projection (step S6). The control unit 8 allows the first emission units 21a, 21b, and 21c to stop emission of the first laser light L1 as the process to terminate displaying the projection that is an example of a process to stop displaying the projection. According to this, displaying the projection is compulsorily terminated. In this manner, the control unit 8 grasps the defect in correlation with the scanning position of the second laser light L2 in the predetermined region R of the light diffusion unit 4. That is, the control unit 8 grasps whether or not a defect occurs in the predetermined region R of the light diffusion unit 4, and grasps a position in the predetermined region R at which the defect occurs in a case where the defect occurs in the light diffusion unit 4.

As described above, in the projection display device 1, the light selection unit 5 reflects the second laser light L2 for inspection at a position on the emission surface 4b of the light diffusion unit 4. Accordingly, a state of the predetermined region R is reflected on the second laser light L2 reflected by the light selection unit 5. As a result, according to the projection display device 1, it is possible to grasp a defect such as a damage that occurs in the light diffusion unit 4 by detecting the second laser light L2 reflected by the light selection unit 5. In addition, when using the scanning drive mirror 3, it is possible to perform scanning with the second laser light L2 for inspection along a scanning line of the first laser light L1 for displaying a projection.

Particularly, since the same scanning drive mirror 3 is used, it is possible to perform scanning with the second laser light L2 for inspection on the same scanning line as that of the first laser light L1 for displaying a projection. According to this, it is possible to efficiently and reliably grasp a detect that occurs on the scanning line (that is, a defect that has an effect on displaying the projection) while permitting a defect that occurs at a position that deviates from the scanning line (that is, a defect that has no effect on displaying the projection) among defects such as a damage that occurs in the light diffusion unit 4. Furthermore, according to the projection display device 1, it is also possible to grasp a defect such as detachment of the light diffusion unit 4.

Particularly, the light selection unit 5 is provided the position on the emission surface 4b of the light diffusion unit 4, and allows the first laser light L1 to be transmitted therethrough and reflects the second laser light L2 at the position. According to this, the second laser light L2 is transmitted through the incident surface 4a and the inside of the light diffusion unit 4, reaches the emission surface 4b of the light diffusion unit 4, and is reflected by the light selection unit 5. As a result, it is possible to grasp a defect that occurs on the incident surface 4a and the emission surface 4b of the light diffusion unit 4, and the inside of the light diffusion unit 4.

In addition, the control unit 8 acquires a detection value related to an optical quantity of the second laser light L2 in correlation with a scanning position of the second laser light L2 in the predetermined region R of the light diffusion unit 4. According to this, in a case where a defect occurs in the light diffusion unit 4, it is possible to grasp a position in the predetermined region R at which the defect occurs.

In addition, the emission surface 4b of the light diffusion unit 4 has a structure that is likely to be exposed to the outside, and thus in this case, the emission surface 4b is more likely to be damaged in comparison to the incident surface 4a of the light diffusion unit 4. In this regard, since the light selection unit 5 is located on the emission surface 4b of the light diffusion unit 4, it is possible to reliably grasp a defect that occurs on the emission surface 4b.

In addition, the light source 2 includes the first emission units 21a, 21b, and 21c that emit the first laser light L1, and the second emission unit 22 that emits the second laser light L2. According to this, a wavelength region of the first laser light L1 and a wavelength region of the second laser light L2 can be easily made to be different from each other.

In addition, the wavelength region of the first laser light L1 and the wavelength region of the second laser light L2 deviate from each other. According to this, an optical member that has a function of allowing a light having the wavelength region of the first laser light L1 to be transmitted therethrough and of reflecting a light having the wavelength region of the second laser light L2 can be used as the light selection unit 5.

In addition, the wavelength region of the first laser light L1 is a visible region, and the wavelength region of the second laser light L2 is an infrared region. A light of an infrared region is less likely to be diffused in comparison to a light of a visible region, and thus it is possible to stabilize detection of the second laser light L2 by the light detection unit 6.

In addition, the light detection unit 6 is disposed on an outer side of the body 7. According to this, it is possible to increase the degree of freedom of a position at which the light detection unit 6 is disposed. In addition, it is possible to dispose the light detection unit 6 at a position close to the light diffusion unit 4 (as described above, for example, between the scanning drive mirror 3 and the light diffusion unit 4 in a direction in which the scanning drive mirror 3 and the light diffusion unit 4 face each other) so as to sufficiently secure an optical amount of the second laser light L2 for inspection.

In addition, the projection display device 1 further includes a control unit 8 that executes a process to detect the second laser light L2 during displaying the projection. According to this, in a case where a defect occurs in the light diffusion unit 4 during displaying the projection, it is possible to immediately grasp the defect. As a result, according to the projection display device 1, it is possible to reliably prevent the first laser light L1 for displaying a projection from being emitted to the outside of the projection display device 1 without being sufficiently diffused due to a defect such as a damage that occurs in the light diffusion unit 4.

Second Embodiment

Figure 5:
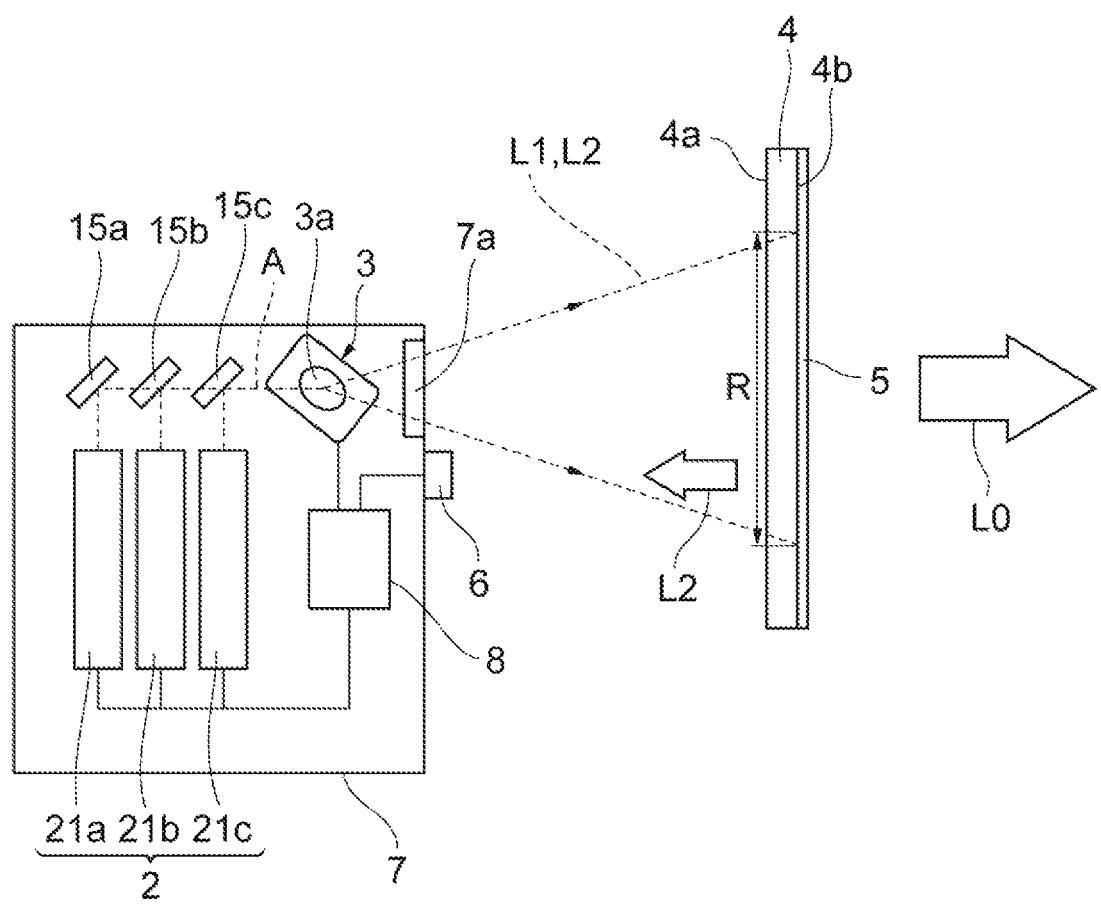
FIG. 5 is a schematic view of a part of a projection display device according to a second embodiment.

A projection display device 1 according to a second embodiment is different from the projection display device 1 according to the first embodiment in the configuration of the light source 2 and the light selection unit 5. As illustrated in FIG. 5, the light source 2 is not provided with the second emission unit 22. In addition, the light selection unit 5 is an optical member having a function of allowing a part of laser light emitted from any one of the first emission units 21a, 21b, and 21c to be transmitted therethrough as the first laser light L1 for displaying a projection, and of reflecting the remainder of the laser light as the second laser light L2 for inspection.

For example, a part of laser light emitted from the first emission unit 21c that is a blue laser diode is used as the first laser light L1 for displaying a projection, and the remainder of the laser light is used as the second laser light L2 for inspection. The reason for this is because a blue laser diode can emit an optical quantity greater than an optical quantity necessary for displaying the projection.

In this manner, in the second embodiment, a wavelength region of the first laser light L1 and a wavelength region of the second laser light L2 overlap each other. The wavelength region of the first laser light L1 and the wavelength region of the second laser light L2 are visible regions.

As described above, in the light source 2 of the projection display device 1 according to the second embodiment, any one of the first emission units 21a, 21b, and 21c emits laser light including the first laser light L1 and the second laser light L2. According to this, the second emission unit 22 that dedicatedly emits the second laser light L2 for inspection is not necessary, and thus it is possible to realize the light source 2 with a simple configuration.

In addition, the wavelength region of the first laser light L1 and the wavelength region of the second laser light L2 overlap each other. According to this, an optical member that has a function of allowing a part of laser light to be transmitted therethrough as the first laser light L1 and of reflecting the remainder of the laser light as the second laser light L2 can be used as the light selection unit 5.

In addition, the wavelength region of the first laser light L1 and the wavelength region of the second laser light L2 are visible regions. According to this, a laser light of a visible region that a is used in the process to display the projection can be used in the process to detect the second laser light L2.

Hereinbefore, description has been given of the first and second embodiments of the invention, but the invention is not limited to the embodiments.

For example, the scanning drive mirror 3 may be a galvano mirror without limitation to the electromagnetic drive type optical mirror that is manufactured according to an MEMS technology. In addition, with regard to a drive method, other methods such as an electrostatic drive method, a piezoelectric drive method, a thermal drive method may be employed without limitation to the electromagnetic drive type. In addition, the projection display device 1 may be respectively provided with the scanning drive mirror 3 for the first laser light L1 and the scanning drive mirror 3 for the second laser light L2.

In addition, the light diffusion unit 4 is not limited to the microlens array as long as the light diffusion unit 4 is constituted by an optical member having a function of diffusing a light. As an example, a frost type diffusion plate, an opal type diffusion plate, and the like can be used as the light diffusion unit 4.

Figure 6:
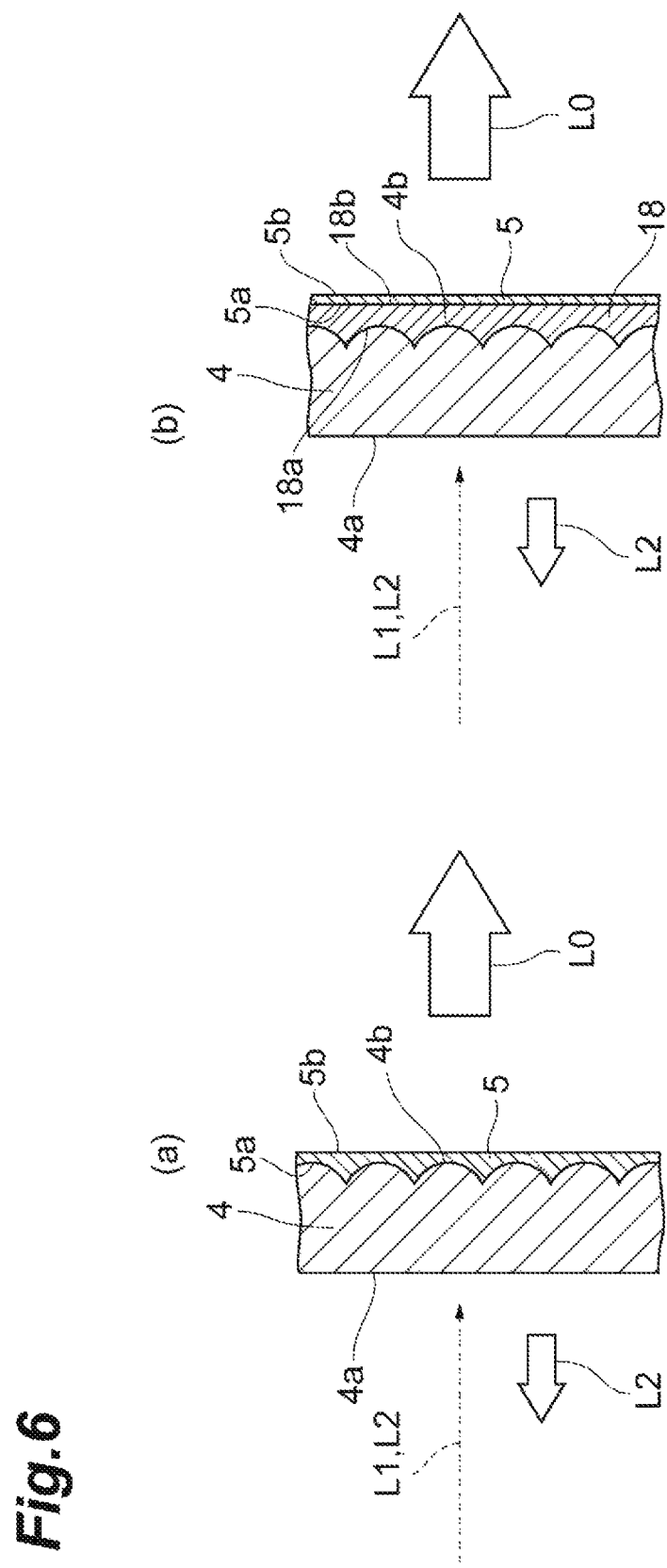
FIG. 6 is a cross-sectional view of a modification example of the light diffusion unit and the light selection unit of the projection display devices according to the first embodiment and the second embodiment.

In addition, as illustrated in (a) of FIG. 6, the light selection unit 5 may be formed on the emission surface 4b of the light diffusion unit 4 in such a manner that a surface 5a on a light diffusion unit 4 side conforms to the plurality of convex surfaces in emission surface 4b of the light diffusion unit 4, and a surface 5b opposite to the light diffusion unit 4 becomes a flat surface. In addition, as illustrated in (b) of FIG. 6, the light selection unit 5 may be formed on the emission surface 4b of the light diffusion unit 4 through a light transmission layer 18 through which the first laser light L1 and the second laser light L2 are transmitted. Here, the light transmission layer 18 is formed on the emission surface 4b of the light diffusion unit 4 in such a manner that a surface 18a on a light diffusion unit 4 side conforms to the plurality of convex surfaces in the emission surface 4b of the light diffusion unit 4, and a surface 18b opposite to the light diffusion unit 4 becomes a flat surface. The light selection unit 5 is formed on the surface 18b of the light transmission layer 18 in such a manner that the surface 5a on the light diffusion unit 4 side and the surface 5b opposite to the light diffusion unit 4 become flat surfaces. In this manner, the light selection unit 5 may be directly formed on the light diffusion unit 4, or may be indirectly formed on the light diffusion unit 4 through another layer and the like.

Figure 7:
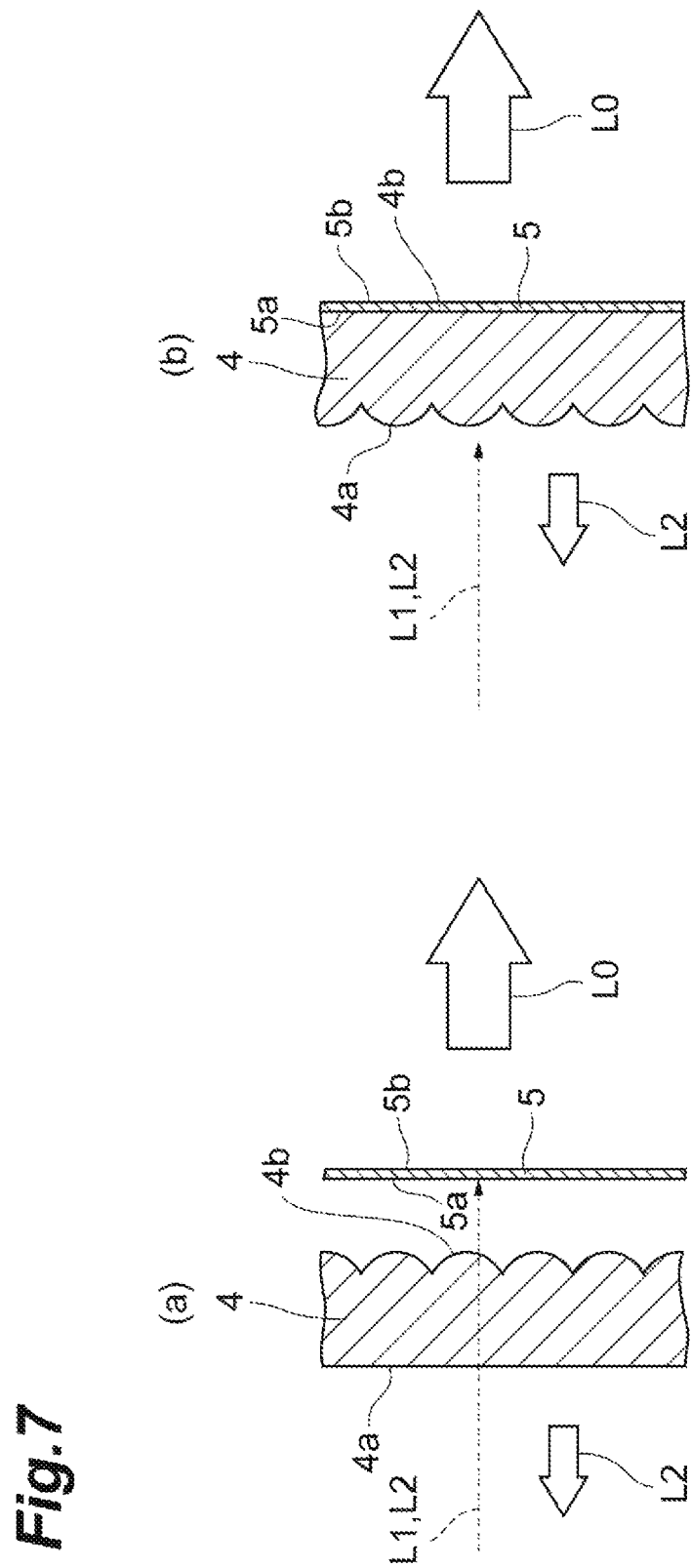
FIG. 7 is a cross-sectional view of a modification example of the light diffusion unit and the light selection unit of the projection display devices according to the first embodiment and the second embodiment.

In addition, as illustrated in (a) of FIG. 7, the light selection unit 5 may be provided at a position that is distant from the emission surface 4b toward an emission side of the light diffusion unit 4, and may allow the first laser light L1 to be transmitted therethrough and may reflect the second laser light L2 at the position. According to this, as is the case with the first and second embodiments, it is possible to grasp a defect that occurs on the incident surface 4a and the emission surface 4b of the light diffusion unit 4 and at the inside of the light diffusion unit 4. In addition, as illustrated in (b) of FIG. 7, the incident surface 4a of the light diffusion unit 4 may be constituted by a plurality of convex surfaces corresponding to a plurality of microlenses, and the emission surface 4b may be configured as a flat surface.

Figure 8:
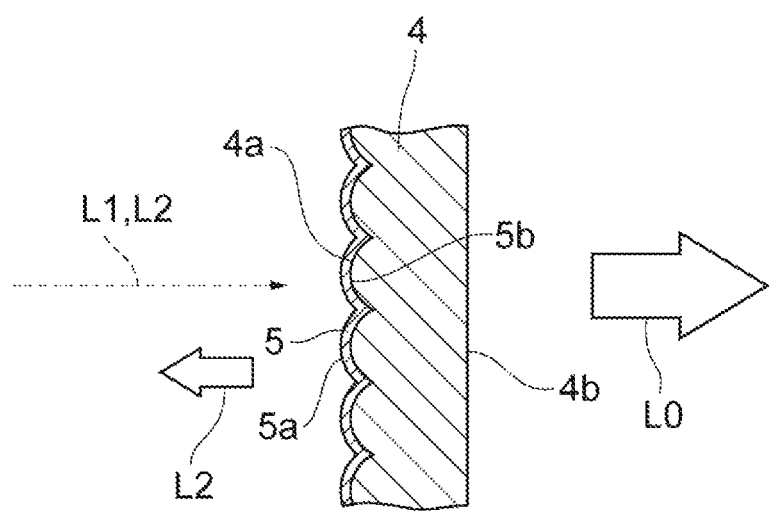
FIG. 8 is a cross-sectional view of a modification example of the light diffusion unit and the light selection unit of the projection display devices according to the first embodiment and the second embodiment.

In addition, as illustrated in FIG. 8, the light selection unit 5 may be provided at a position on the incident surface 4a of the light diffusion unit 4, and may allow the first laser light L1 to be transmitted therethrough and may reflect the second laser light L2 at the position. According to this, it is possible to grasp a defect that Occurs on the incident surface 4a of the light diffusion unit 4. In this case, it is preferable that the light selection unit 5 is an optical member having a function of diffusing the second laser light L2 in addition to a function of reflecting the second laser light L2. According to this, even in a case where any position in the predetermined region R is scanned with the second laser light L2, it is possible to grasp a defect that occurs on the incident surface 4a of the light diffusion unit 4.

In addition, the light selection unit 5 may be a single phase film, a multi-layer film, a sheet-shaped member, and the like as long as these are optical members having a function of allowing the first laser light L1 to be transmitted therethrough and reflecting the second laser light L2. In addition, the light selection unit 5 may have a shape conforming to the incident surface 4a or the emission surface 4b of the light diffusion unit 4, or may have a shape that does not conform to the incident surface 4a or the emission surface 4b of the light diffusion unit 4. As described above, the light selection unit 5 may be disposed at a position (at a position on the incident surface 4a of the light diffusion unit 4, at a position on the emission surface 4b of the light diffusion unit 4, or at a position that is distant from the emission surface 4b toward the emission side of the light diffusion unit 4 and at which the first laser light L1 used in the scanning is allowed to be transmitted therethrough and the second laser light L2 used in the scanning is reflected therefrom) corresponding to the predetermined region R of the light diffusion unit 4, and may allow the first laser light L1 to be transmitted therethrough and may reflect the second laser light L2 at the position.

Figure 9:
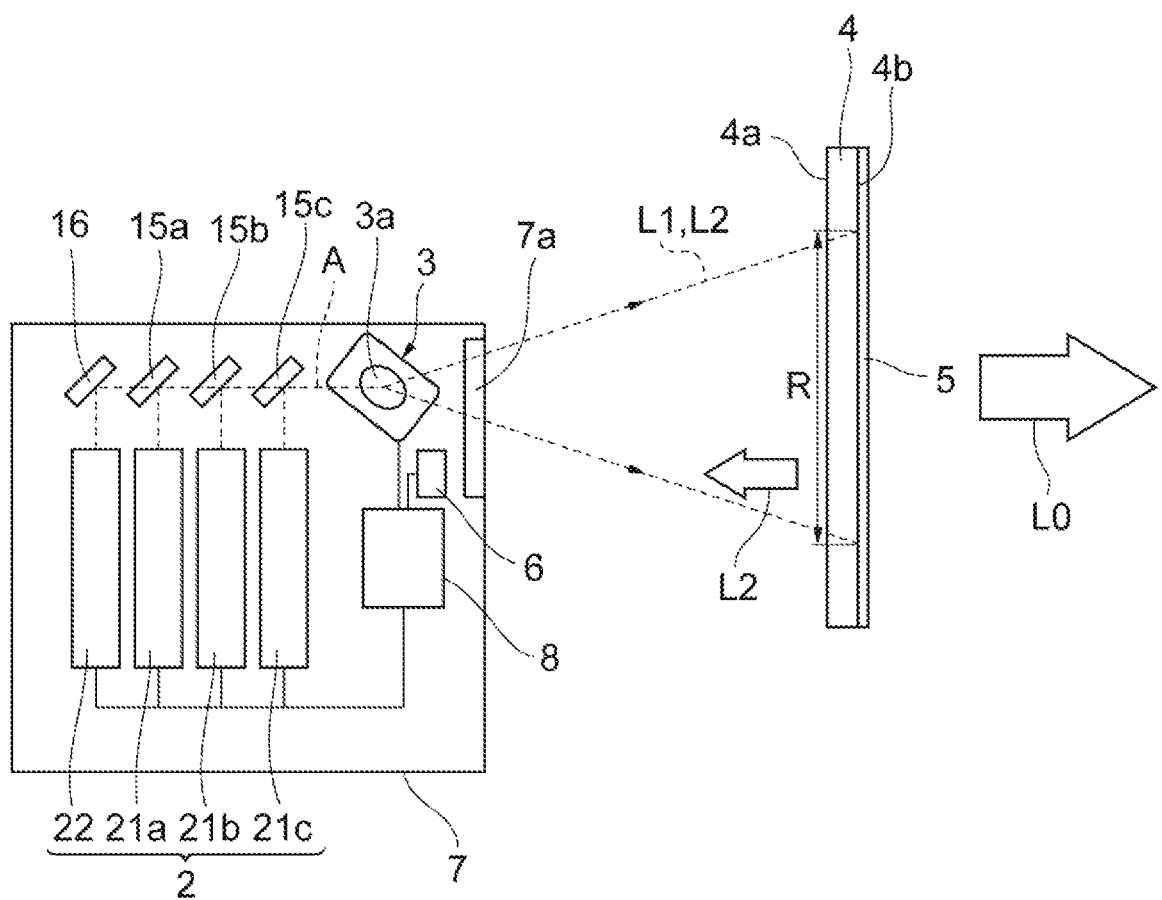
FIG. 9 is a schematic view of a modification example of a part of the projection display device according to the first embodiment.
Figure 10:
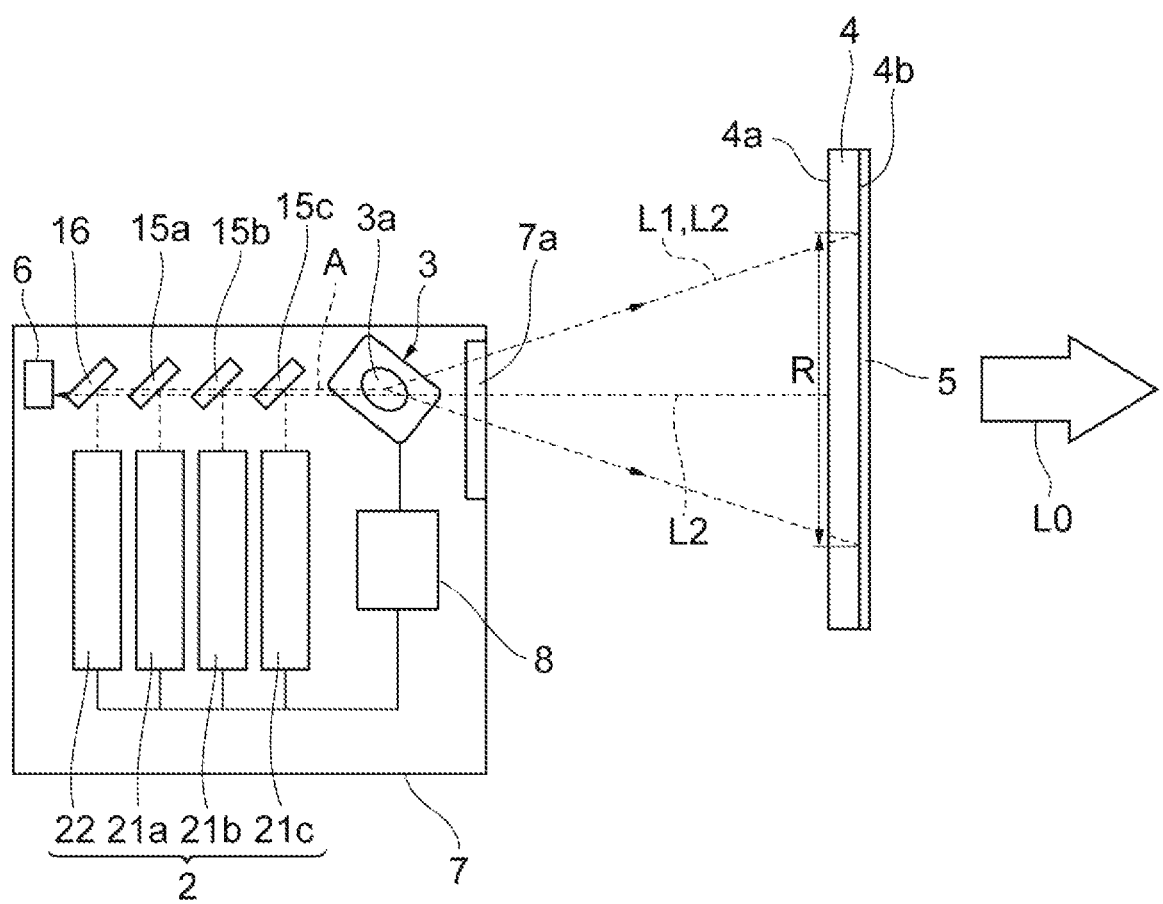
FIG. 10 is a schematic view of a modification example of a part of the projection display device according to the first embodiment.
Figure 11:
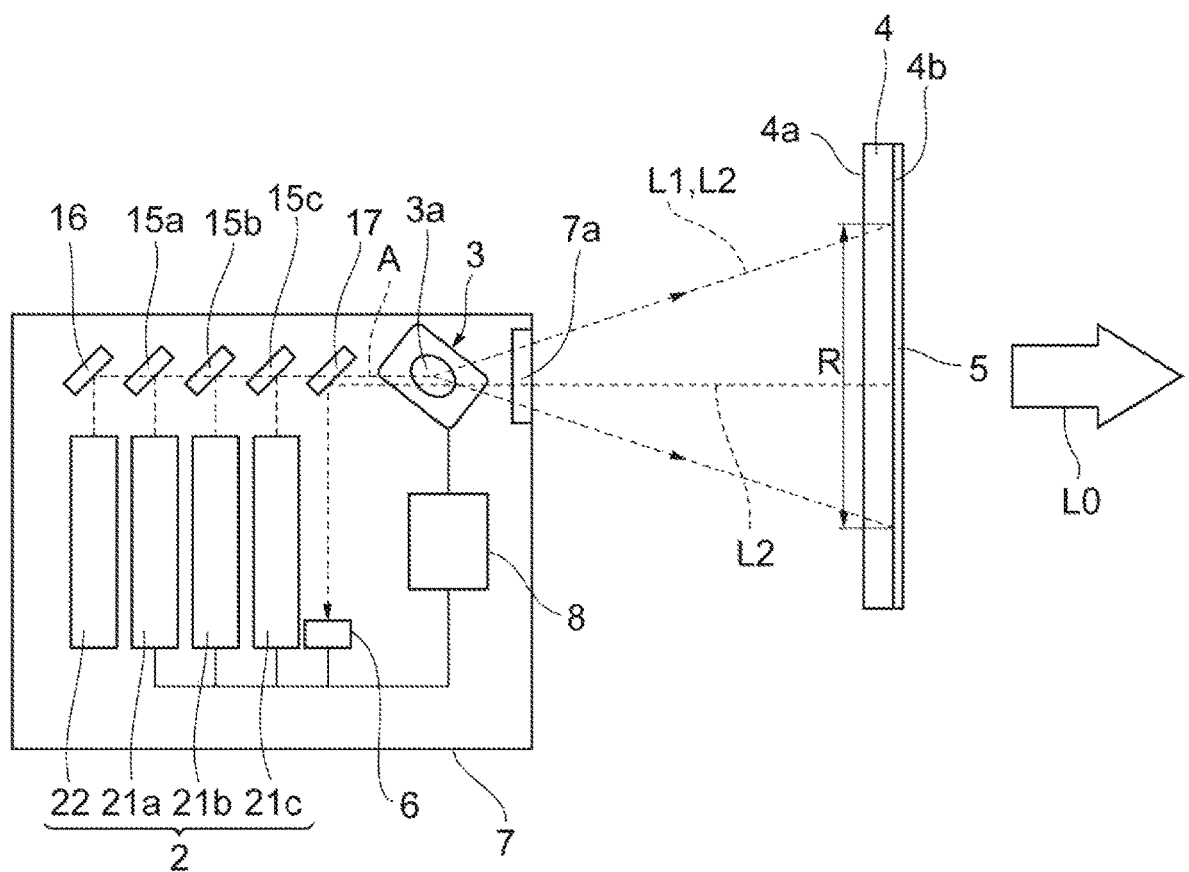
FIG. 11 is a schematic view of a modification example of a part of the projection display device according to the first embodiment.

In addition, as illustrated in FIG. 9 to FIG. 11, the light detection unit 6 may be disposed on an inner side of the body 7. According to this, it is possible to protect the light detection unit 6.

Specifically, as illustrated in FIG. 9, the light detection unit 6 may be disposed at a position that faces the window 7a on an inner side of the body 7. In this case, the light detection unit 6 can reliably detect the second laser light L2 that is transmitted from the window 7a in second laser light L2 reflected by the light selection unit 5.

In addition, as illustrated in FIG. 10, the light detection unit 6 may be disposed on a side that is opposite to the scanning drive mirror 3 on the basis of the mirror 16, on an extended line of the optical path A. Here, the mirror 16 is an optical member having a function of reflecting a part (for example, 50%) of incident second laser light L2 and of allowing the remainder (for example, 50%) of the incident second laser light L2 to be transmitted therethrough. According to this, a part of second laser light L2 emitted from the second emission unit 22, is reflected by the mirror 16 and proceeds along the optical path A. On the other hand, a part of the second laser light L2 that returned again to the inside of the body 7 is transmitted through the mirror 16 and is detected by the light detection unit 6.

In addition, as illustrated in FIG. 11, a mirror 17 may be disposed between the mirror 15c and the scanning drive mirror 3 on the optical path A, and the light detection unit 6 may be disposed in the body 7 to face the mirror 17. Here, for example, the mirror 17 is a mirror provided with a through-hole that is formed on the optical path A. According to this, the first laser light L1 and the second laser light L2 that proceed along the optical path A toward the scanning drive mirror 3 pass through the through-hole of the mirror 17. On the other hand, the second laser light L2 that returned again to the inside of the body 7 is reflected by the mirror 17 and is detected by the light detection unit 6. The second laser light L2 that returned to the inside of the body 7 is diffused by the light diffusion unit 4, and thus optical axes of the first laser light L1 and the second laser light L2 that proceed toward the scanning drive mirror 3 deviate from each other. According to this, the second laser light L2 that returned again to the inside of the body 7 is reflected at a portion of the mirror 17 other than the through-hole. The mirror 17 as described above may be disposed between the mirror 15a and the mirror 15b or between the mirror 15b and the mirror 15c on the optical path A. However, when the mirror 17 is disposed between the mirror 15c and the scanning drive mirror 3, it is possible to sufficiently secure an optical quantity of the second laser light L2 in the light detection unit 6 in comparison to cases where the mirror 17 is disposed at other positions. As a result, it is possible to reliably grasp a defect such as a damage that occurs in the light diffusion unit 4.

In addition, the light detection unit 6 may be a light detector having sensitivity in a wavelength region of the second laser light L2. For example, in the projection display device 1 according to the second embodiment, the wavelength region of the first laser light L1 and the wavelength region of the second laser light L2 are visible regions, and thus the light detector having sensitivity in the visible region can be used as the light detection unit 6. In addition, the light detection unit 6 may be a semiconductor light detector.

In addition, as the process to terminate displaying the projection, the control unit 8 may allow the first emission units 21a, 21b, and 21c to reduce an output of the first laser light L1. In addition, as the process to terminate displaying the projection, the control unit 8 may operate the scanning drive mirror 3 so that the first laser light L1 is incident to regions other than the predetermined region R of the light diffusion unit 4. In this case, for example, it is preferable that a non-transmission treatment is performed to regions other than the predetermined region R of the light diffusion unit 4 in order for the first laser light L1 not to be leaked to the outside of the projection display device 1.

Figure 12:
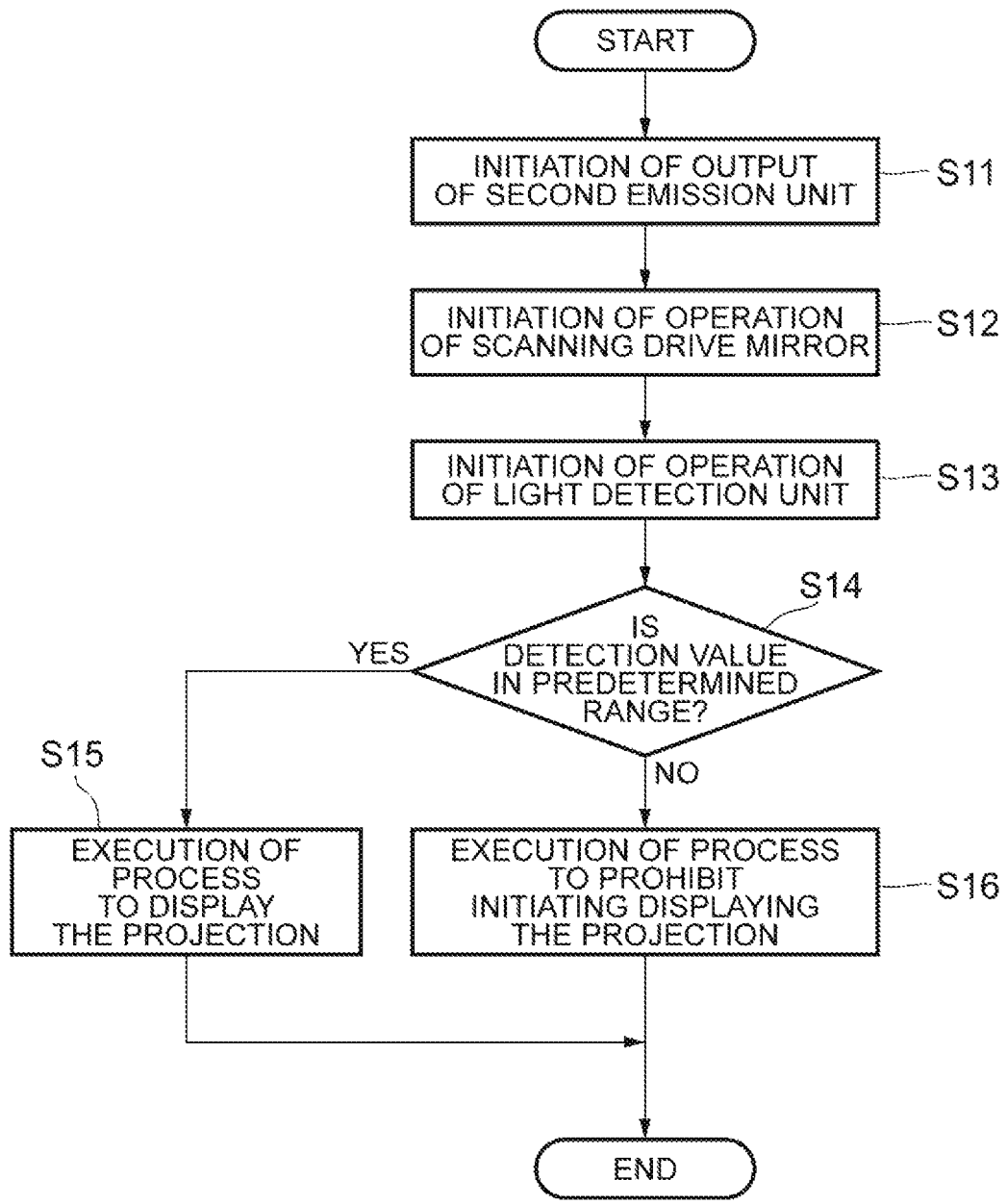
FIG. 12 is a flowchart illustrating a first modification example of a process that is executed by a control unit of the projection display device according to the first embodiment.

Description will be given of a first modification example of the process executed by the control unit 8 (example in which the process to detect the second laser light L2 is executed before displaying the projection) with reference to FIG. 12.

First, when receiving an input signal to initiate displaying the projection, the control unit 8 initiates output of the second emission unit 22 (step S11). According to this, the second laser light L2 is emitted from the second emission unit 22.

The control unit 8 initiates an operation of the scanning drive mirror 3 approximately simultaneously with step S11 (step S12), and the control unit 8 initiates an operation of the light detection unit 6 approximately simultaneously with steps S11 and S12 (step S13). According to this, in the scanning drive mirror 3, swinging of the mirror 3a is initiated, and the predetermined region R of the light diffusion unit 4 is scanned with the second laser light L2 emitted from the light source 2 along a scanning line of the first laser light L1 for displaying a projection.

At this time, the second laser light L2 for inspection used in the scanning by the scanning drive mirror 3 is diffused by the light diffusion unit 4, and is reflected by the light selection unit 5. The second laser light L2 reflected by the light selection unit 5 is transmitted again through the light diffusion unit 4 and is detected by the light detection unit 6.

Here, the control unit 8 receives a detection value related to an optical quantity of the second laser light L2 from the light detection unit 6. The detection value is correlated to a scanning position of the second laser light L2 in the predetermined region R of the light diffusion unit 4. In addition, the control unit 8 determines a state of the light diffusion unit 4 on the basis of the detection value (step S14). More specifically, the control unit 8 stores a reference value related to the optical quantity of the second laser light L2 in correlation with the scanning position of the second laser light L2 in the predetermined region R of the light diffusion unit 4. In correspondence with the scanning position of the second laser light L2 in the predetermined region R of the light diffusion unit 4, the control unit 8 compares the detection value and the reference value that correspond to the position. In a case where the detection value is in a predetermined range from the reference value, the control unit 8 determines that the state of light diffusion unit 4 is normal, and executes the process to display the projection (step S15).

As execution of the process to display the projection, the control unit 8 initiates output of each of the plurality of first emission units 21a, 21b, and 21c. According to this, the light L0 for displaying a projection is guided to the front glass 100 of the vehicle by the planar mirrors 11 and 12 and the concave mirror 13, and reaches eyes of a driver as a video after reflection from the front glass 100 of the vehicle.

On the other hand, in a case where the detection value is out of the predetermined range from the reference value, the control unit 8 determines that a defect occurs in the light diffusion unit 4 as the state of the light diffusion unit 4, and executes a process to prohibit initiating displaying the projection (step S16). As the process to prohibit initiating displaying the projection, even in the case of receiving the input signal to initiate displaying the projection, the control unit 8 does not allow the first emission units 21a, 21b, and 21c to initiate emission of the first laser light L1.

According to this, it is possible to prevent displaying the projection from being executed by the light diffusion unit 4 in which a defect occurs. As a result, according to the projection display device 1, it is possible to reliably prevent the first laser light L1 for displaying a projection from being emitted to the outside of the projection display device 1 without being sufficiently diffused due to a defect such as a damage that occurs in the light diffusion unit 4. Furthermore, it is not necessary for the control unit 8 to execute the process to detect the second laser light L2 whenever receiving the input signal to initiate displaying the projection. For example, the control unit 8 may execute the process to detect the second laser light L2 once whenever the input signal to initiate displaying the projection is received plural times.

Figure 13:
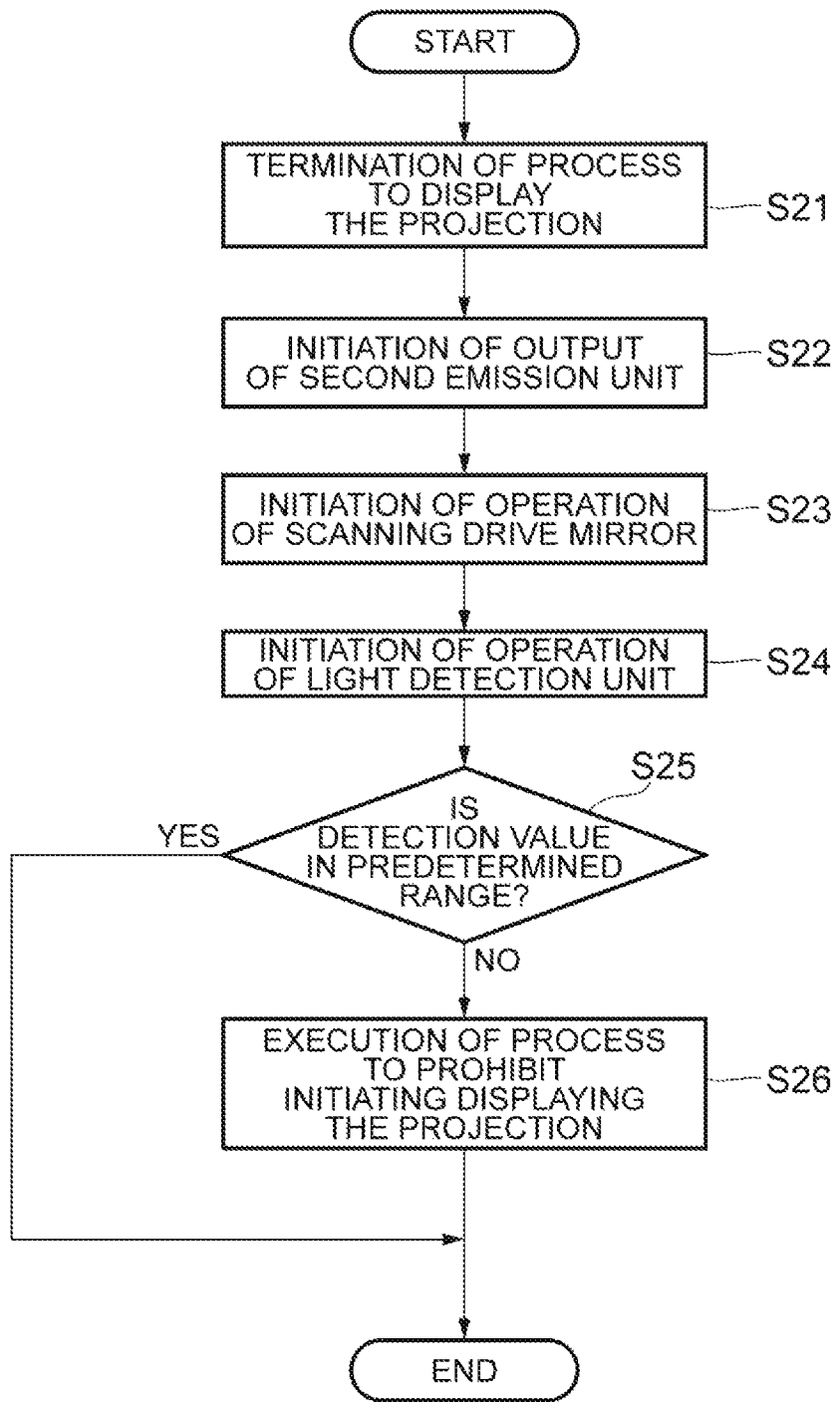
FIG. 13 is a flowchart illustrating a second modification example of the process executed by the control unit of the projection display device according to the first embodiment.

Next, description will be given of a second modification example of the process executed by the control unit 8 (example in which the process to detect the second laser light L2 is executed after displaying the projection) with reference to FIG. 13.

First, the control unit 8 terminates the process to display the projection (step S21). As termination of the process to display the projection, the control unit 8 stops the output of each of the plurality of first emission units 21a, 21b, and 21c, and stops the operation of the scanning drive mirror 3.

Next, the control unit 8 initiates output of the second emission unit 22 (step S22). According to this, the second laser light L2 is emitted from the second emission unit 22.

The control unit 8 initiates an operation of the scanning drive mirror 3 approximately simultaneously with step S22 (step S23), and the control unit 8 initiates an operation of the light detection unit 6 approximately simultaneously with steps S22 and S23 (step S24). According to this, in the scanning drive mirror 3, swinging of the mirror 3a is initiated, and the predetermined region R of the light diffusion unit 4 is scanned with the second laser light L2 emitted from the light source 2 along a scanning line of the first laser light L1 for displaying a projection. On the other hand, when terminating the process to display the projection, the control unit 8 may continue the operation of the scanning drive mirror 3 until step S23 without stopping the operation of the scanning drive mirror 3.

According to this, the second laser light L2 for inspection used in the scanning by the scanning drive mirror 3 is diffused by the light diffusion unit 4 and is reflected by the light selection unit 5. The second laser light L2 reflected by the light selection unit 5 is transmitted again through the light diffusion unit 4, and is detected by the light detection unit 6.

Here, the control unit 8 receives a detection value related to the optical quantity of the second laser light L2 from the light detection unit 6. The detection value is correlated to a scanning position of the second laser light L2 in the predetermined region R of the light diffusion unit 4. In addition, the control unit 8 determines a state of the light diffusion unit 4 on the basis of the detection value (step S25). More specifically, the control unit 8 stores a reference value related to the optical quantity of the second laser light L2 in correlation with the scanning position of the second laser light L2 in the predetermined region R of the light diffusion unit 4. In correspondence with the scanning position of the second laser light L2 in the predetermined region R of the light diffusion unit 4, the control unit 8 compares the detection value and the reference value that correspond to the position. In a case where the detection value is in a predetermined range from the reference value, the control unit 8 determines that the state of the light diffusion unit 4 is normal, and terminates the process as it is.

On the other hand, in a case where the detection value is out of the predetermined range from the reference value, the control unit 8 determines that a defect occurs in the light diffusion unit 4 as the state of the light diffusion unit 4, and executes a process to prohibit initiating displaying the projection (step S26). Even in the case of receiving the input signal to initiate displaying the projection, as the process to prohibit initiating displaying the projection, the control unit 8 does not allow the first emission units 21a, 21b, and 21c to initiate emission of the first laser light L1.

According to this, it is possible to prevent displaying the projection from being executed by the light diffusion unit 4 in which a defect occurs. As a result, according to the projection display device 1, it is possible to reliably prevent the first laser light L1 for displaying a projection from being emitted to the outside of the projection display device 1 without being sufficiently diffused due to a defect such as a damage that occurs in the light diffusion unit 4. Furthermore, it is not necessary for the control unit 8 to execute the process to detect the second laser light L2 whenever terminating the process to display the projection. For example, the control unit 8 may execute the process to detect the second laser light L2 once whenever the process to display the projection is terminated plural times.

Furthermore, in the projection display device 1 according to the respective embodiments, there is a concern that when executing a process to inspect the second laser light L2 before displaying the projection or after displaying the projection, the laser light emitted from the light source 2 may be emitted to the outside of the projection display device 1, and a burden may be placed on eyes of a person who views the projection displayed. Therefore, it is preferable that the projection display device 1 further includes a shutter that can advance and retreat on the optical path of the light L0. According to this, even when an emission optical quantity of the laser light is raised to reliably detect the second laser light L2, it is possible to prevent a burden from being placed on eyes of a person who views the projection displayed by locating the shutter on the optical path of the light L0.

In addition, the projection display device 1 may be used in various aspects such as a helmet-embedded type, an eyeglass type without limitation to the vehicle-mounted type.

INDUSTRIAL APPLICABILITY

According to the invention, it is possible to provide a projection display device capable of grasping a defect such as a damage that occurs in a light diffusion unit.

REFERENCE SIGNS LIST

1: Projection display device, 2: Light source, 3: Scanning drive mirror (drive reflection unit), 4: Light diffusion unit, 4a: Incident surface, 4b: Emission surface, 5: Light selection unit, 6: Light detection unit, 7: Body, 8: Control unit, 21a, 21b, 21c: First emission unit, 22: Second emission unit, L1: First laser light, L2: Second laser light.

The invention claimed is:
1. A projection display device, comprising:
a light source that emits a first laser light for displaying a projection and a second laser light for inspection;
a drive reflection unit that reflects the first laser light and the second laser light emitted from the light source, and uses the first laser light and the second laser light in scanning;

a light diffusion unit that has an incident surface on which the first laser light and the second laser light are incident and an emission surface opposite to the incident surface, allows the first laser light and the second laser light used in the scanning by the drive reflection unit to be transmitted through the light diffusion unit, and diffuses the first laser light and the second laser light;

a light selection unit that is disposed on the emission surface side of the light diffusion unit and that allows the first laser light to be transmitted through the light selection unit and reflects the second laser light (i) at a position on the emission surface of the light diffusion unit, or (ii) at a position that is distant from the emission surface toward the emission surface side of the light diffusion unit;

a light detection unit that detects the second laser light diffused by the light diffusion unit and reflected by the light selection unit; and a member having a through-hole that allows the first laser light and the second laser light to pass through between the light source and the drive reflection unit, wherein the first laser light and the second laser light passing through the through-hole are made incident on the drive reflection unit, and thereby the second laser light scans along a scanning line of the first laser light.

2. The projection display device according to claim 1, wherein the light source includes a first emission unit that emits the first laser light, and a second emission unit that emits the second laser light.

3. The projection display device according to claim 2, wherein a wavelength region of the first laser light and a wavelength region of the second laser light deviate from each other.

4. The projection display device according to claim 3, wherein the wavelength region of the first laser light is a visible region, and the wavelength region of the second laser light is an infrared region.

5. The projection display device according to claim 1, wherein the light source includes an emission unit that emits laser light including the first laser light and the second laser light.

6. The projection display device according to claim 5, wherein a wavelength region of the first laser light and a wavelength region of the second laser light overlap each other.

7. The projection display device according to claim 6, wherein the wavelength region of the first laser light and the wavelength region of the second laser light are visible regions.

8. The projection display device according to claim 1, further comprising:

a body that accommodates the light source and the drive reflection unit, wherein the light detection unit is disposed on an outer side of the body.

9. The projection display device according to claim 1, further comprising:

a body that accommodates the light source and the drive reflection unit, wherein the light detection unit is disposed on an inner side of the body.

10. The projection display device according to claim 1, further comprising:

a control unit that executes a process to detect the second laser light during displaying the projection.

11. The projection display device according to claim 10, wherein the control unit determines a state of the light diffusion unit on the basis of a detection value of the light detection unit.

12. The projection display device according to claim 1, further comprising:

a control unit that executes a process to detect the second laser light at least one of before displaying the projection and after displaying the projection.

13. The projection display device according to claim 12, wherein the control unit determines a state of the light diffusion unit on the basis of a detection value of the light detection unit.

\* \* \* \* \*